Sept. 30, 1947.   J. G. HOLMSTROM ET AL   2,428,160
TORSION-ROD SUSPENSION FOR TANDEM THROUGH-AXLE VEHICLES
Filed July 26, 1943   7 Sheets-Sheet 1

INVENTORS:
John G. Holmstrom
Wallace M. Brown

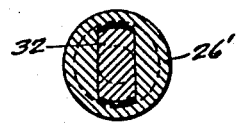
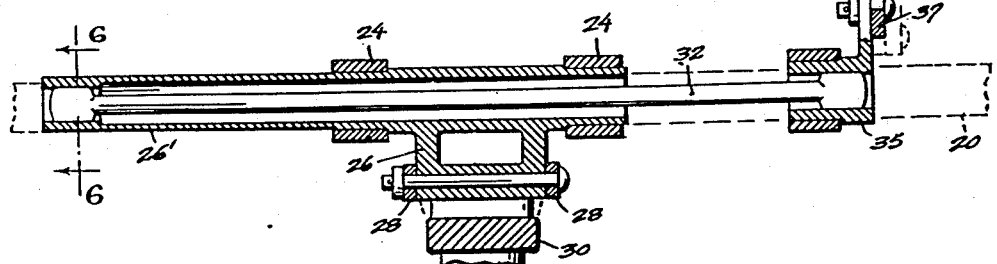
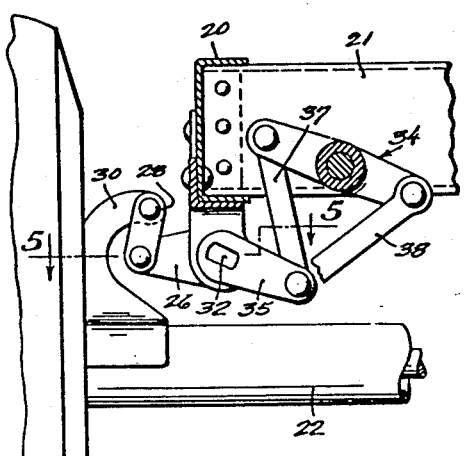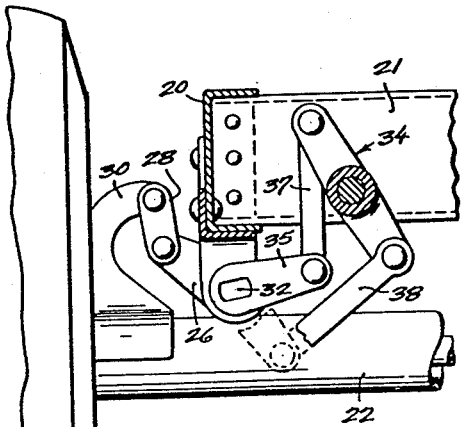

INVENTORS:
John G. Holmstrom
Wallace M. Brown

Sept. 30, 1947.  J. G. HOLMSTROM ET AL  2,428,160
TORSION-ROD SUSPENSION FOR TANDEM THROUGH-AXLE VEHICLES
Filed July 26, 1943  7 Sheets-Sheet 5

INVENTORS:
John G. Holmstrom
Wallace M. Brown
BY
atty

INVENTORS:
John G. Holmstrom
Wallace M. Brown

Sept. 30, 1947.      J. G. HOLMSTROM ET AL      2,428,160
TORSION-ROD SUSPENSION FOR TANDEM THROUGH-AXLE VEHICLES
Filed July 26, 1943          7 Sheets-Sheet 7
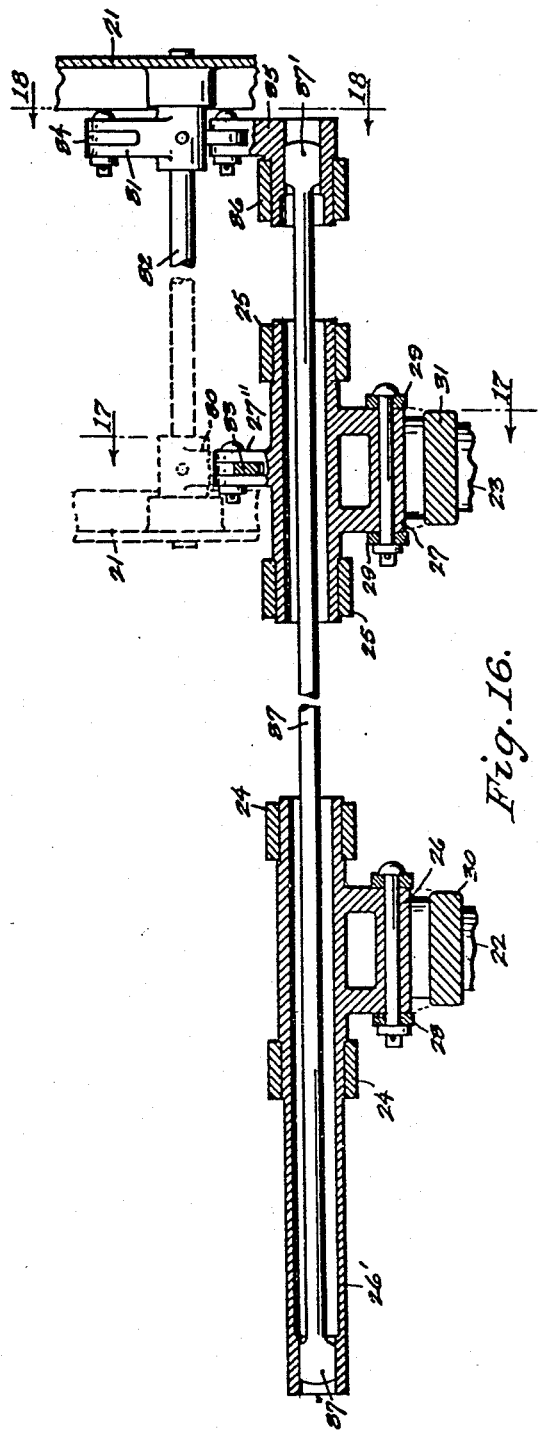
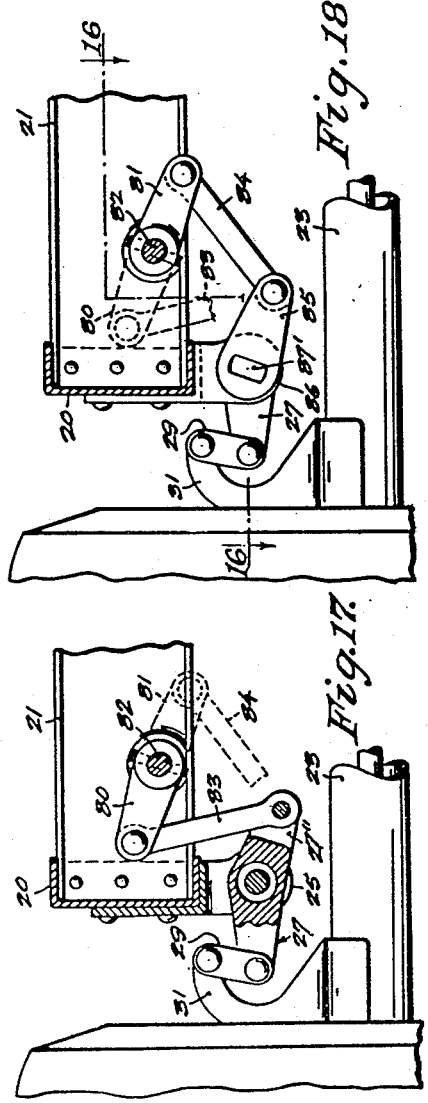
INVENTORS:
John G. Holmstrom
Wallace M. Brown
BY Patented Sept. 30, 1947

2,428,160

UNITED STATES PATENT OFFICE 2,428,160

TORSION-ROD SUSPENSION FOR TANDEM THROUGH-AXLE VEHICLES

John G. Holmstrom and Wallace M. Brown, Seattle, Wash., assignors to Kenworth Motor Truck Corporation, Seattle, Wash., a corporation of Washington Application July 26, 1943, Serial No. 496,238

9 Claims. (Cl. 280—104.5)

This invention relates to suspension mechanism for tandem-axle vehicles and, more particularly, to mechanism employing torsion springs as the agent responsible for springing the vehicle frame from the tandem rear axles. The present application is a continuation-in-part of our Letters Patent of the United States No. 2,333,008, filed April 14, 1941, and issued October 26, 1943.

Clarity in an understanding will perhaps be advanced by briefly considering the embodiment of the invention which we elected to illustrate and particularly described in our said earlier filing and which, as with the departures which we referred to therein and which are herein given more material substance by detailed illustration and specific description, aimed to provide a torsion-spring hook-up so engineered as to eliminate any anchor-connection between the said springs and the frame of the vehicle, thus accomplishing what in effect is a full-floating suspension. This general object can be otherwise stated to reside in an arrangement in which there is passed into the vehicle frame only a perpendicular mean of the resisting forces built up within the torsion springs as the same are caused to twist under axle movements. In accomplishing this end, the structural design which, in the parent filing, was selected as a preferred embodiment was chosen primarily by reason of its requiring a minimum of parts and enabling the weight of the suspension assembly to be reduced somewhat by comparison with the alternative arrangements exemplified in the modifications which we now illustrate. More particularly distinguished, the first said embodiment is one in which a single torsion rod located to extend horizontally in a direction longitudinally of the vehicle is applied as a cushion-coupling between two frame-journaled levers, one lever occupying a position above one and the other lever occupying a position above the other of the two tandem rear axles To accomplish the intended office of resisting axle movements as the latter are subjected to the influence of road irregularities or of driving or braking torque reactions—looking to an action in which vertical movements of either axle builds up a force-load influencing the other axle in an opposite direction—the embodiment referred to shackles the free ends of the levers to their related axles and, in mounting the levers, resorts to the simple expedient of having the free end of one lever extend outwardly and the free end of the other lever extend inwardly, consequently imparting a torsional wind-up to the torsion spring under the influence of like directive movements of the two axles. There is this problem which arises, however, in the engineering of the recited arrangement, namely that it is desirable to so locate the shackle links as to have rectilineal prolongations of each said link traverse, or approximately traverse, the road surface at the inner point of contact of the tires. In effectuating this relationship while still maintaining the shackle links in the required upright position without, as respects the link for the inwardly directed lever, removing the same an undue distance from the tire, we found a practical answer in the expedient of mounting the torsion rod oblique to the longitudinal median line of the vehicle and thus allow the inwardly directed lever to be shifted outwardly in relation to the position of the outwardly directed lever. Canting the torsion rod and which perforce produces an angular pivoting of the levers and the related links produces a certain trailing or castering effect which is of advantage, but there is a manufacturing objection in the fact that, to mount the levers, a bend corresponding to the angularity of the lever axes—these being aligned in the use of a single torsion rod—should properly be provided in the supporting frame girder.

Being fully cognizant of the manufacturing objection it was expressly pointed out in our earlier filing that the same could be overcome by the instrumentality of having the two levers, front and rear, both extend in a like direction from a straight frame girder, and that the arrangement so applied could be caused to accomplish the end of imparting opposite rotational tendencies to the torsion rod under like axle movements by introducing a reversing mechanism between one end of the torsion rod and the lever related thereto. We also pointed out that this could be accomplished by employing two torsion rods rotationally fixed one to one and the other to the other lever and introducing the reversing mechanism as an interconnection between the ends of the two torsion rods distal to the lever-connections.

The present application details the construction of various torsion-rod suspensions according to the said alternative teachings of our earlier filing, it being pointed out, however, that there are numerous other arrangements possible which are operative to develop a rotational wind-up in a torsion spring or springs by the action of levers which themselves move in a like direction of twist under the influence of like axle movements.

The invention consists in the novel construction and in the adaptation and combination of parts of which the embodiments shown in the accompanying drawings and hereinafter described and claimed are illustrative examples.

In said drawings:

Figure 1 is a fragmentary top plan view showing one side of a tandem-axle vehicle having a torsion-spring suspension functioning to the same end as the embodiment illustrated in our above-identified co-pending application and which, to permit the two axle-influenced levers to each extend in a like direction from the supporting frame girder, employs two complementary torsion rods rotatively fixed at one end of each to a related lever and at the opposite ends being interconnected by a reversing mechanism consisting of a system of levers.

Fig. 3 is a fragmentary transverse vertical section taken to an enlarged scale on line 3—3 of Fig. 1.

Fig. 4 is a view similar to Fig. 3 but showing the positions of the parts when the vehicle is subjected to a condition augmenting the spring load.

Fig. 5 is a fragmentary horizontal section on line 5—5 of Fig. 3 detailing the arrangement, only one of the two associated torsion rods being shown and dotted lines being employed to represent the frame channel and a part of the reversing mechanism.

Fig. 6 is a detail transverse vertical section taken to an enlarged scale on line 6—6 of Fig. 5 to illustrate the manner of anchoring the torsion rod to the levers for subjecting the former to a wind-up in response to rocker movement of the latter.

Figure 9:
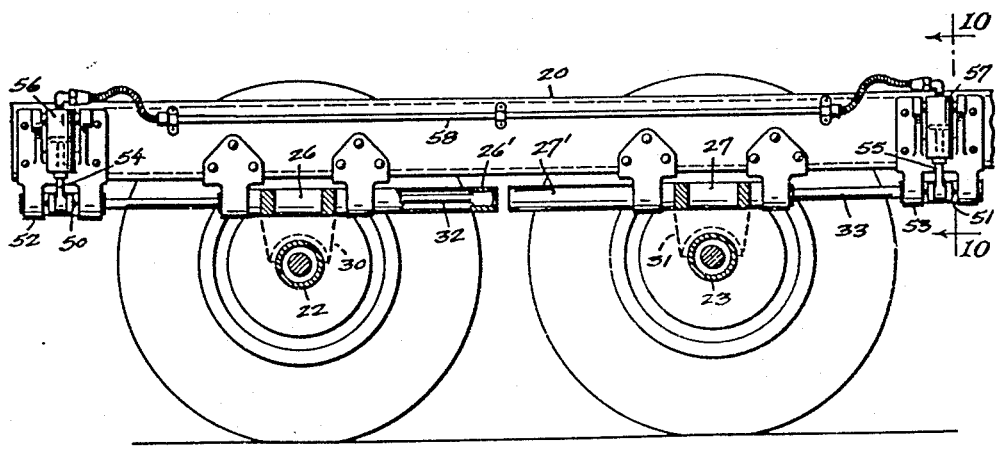

Fig. 9 fragmentarily illustrates a tandem rear-axle vehicle having two torsion rods in which connection, for reversibly twisting the same under like movements of related levers, is of a hydraulic nature.

Figure 10:
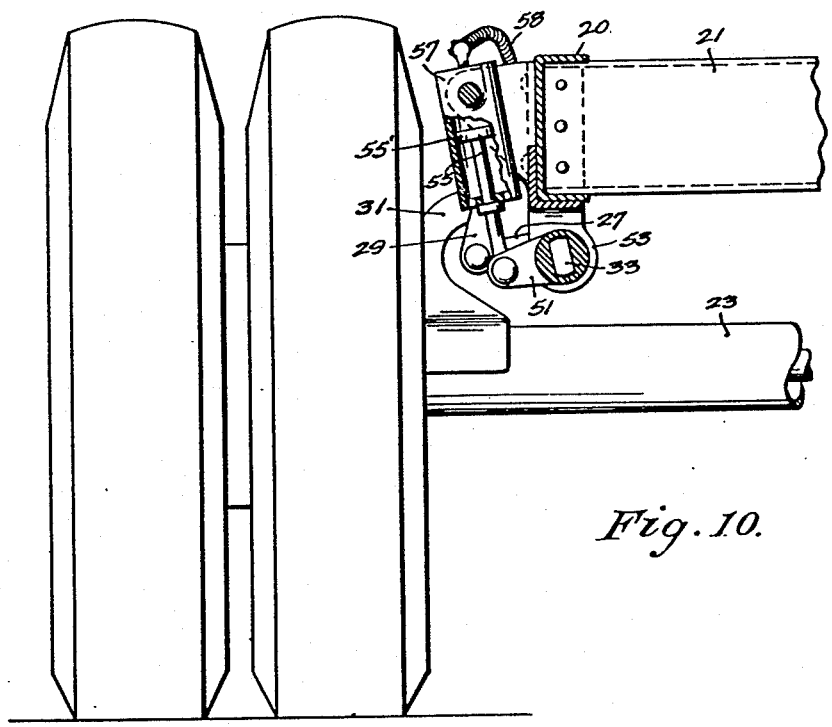

Fig. 10 is a fragmentary transverse vertical section taken to an enlarged scale on line 10—10 of Fig. 9.

Figure 11:
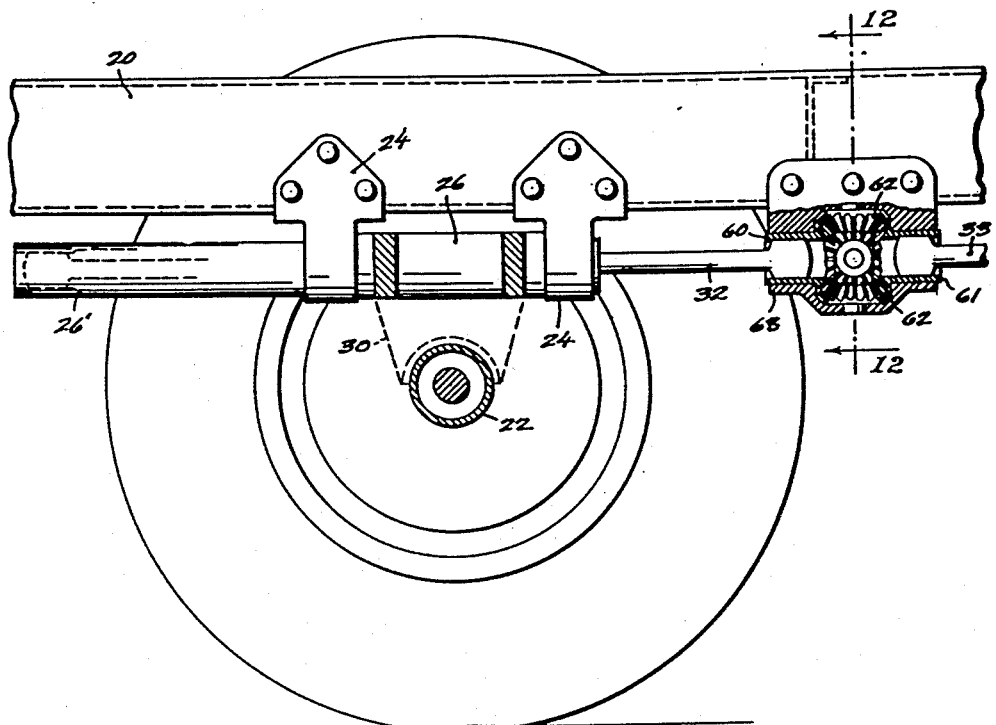

Fig. 11 is a fragmentary longitudinal vertical section showing yet another embodiment characterized by the employment of gears as the reversing medium, still using two torsion rods.

Figure 12:
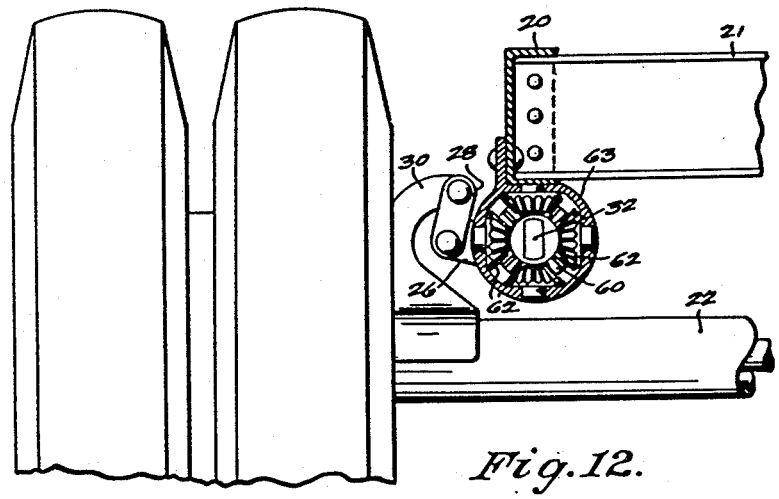

Fig. 12 is a fragmentary transverse vertical section on line 12—12 of Fig. 11.

Figure 13:
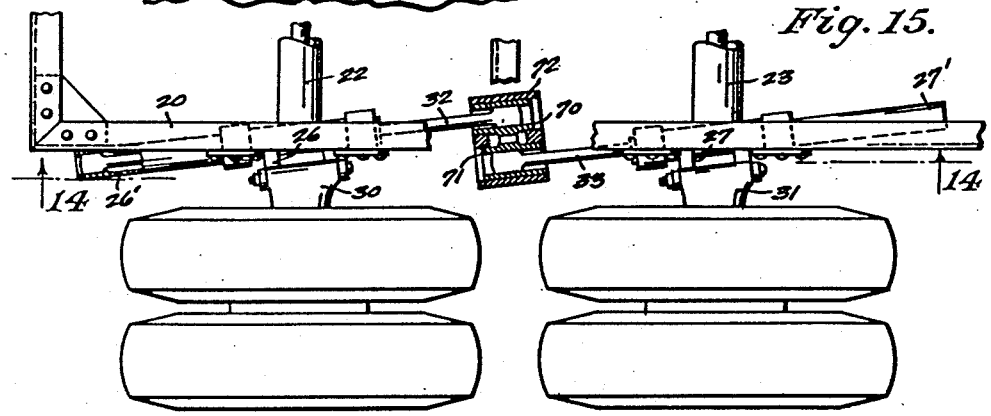

Fig. 13 is a fragmentary top plan view with parts broken away and shown in section to illustrate an arrangement of two torsion rods located such that the same occupy planes diagonal to the longitudinal median line of the vehicle, off-setting the same for torsional movement about paralleling spaced axes and applying segment gears as a reversing interconnection.

Figure 14:
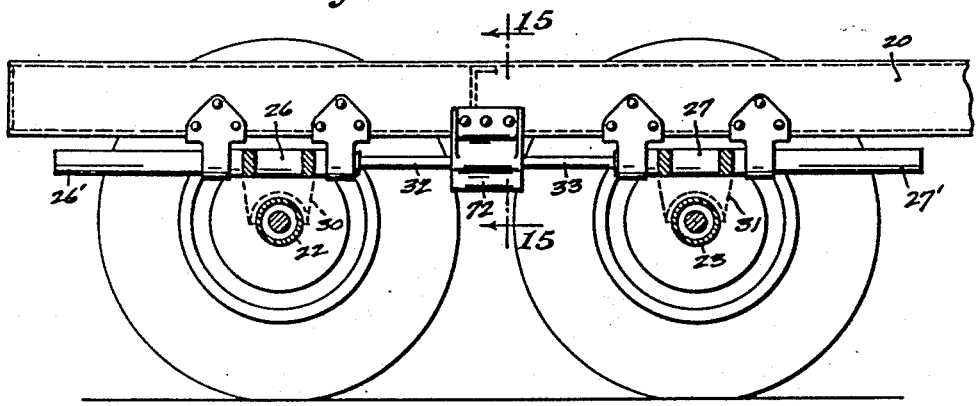

Fig. 14 is a longitudinal vertical section on line 14—14 of Fig. 13, departing from a true showing by viewing the suspension assembly at right angles to the axes of the rods in order to simplify the illustration.

Figure 15:
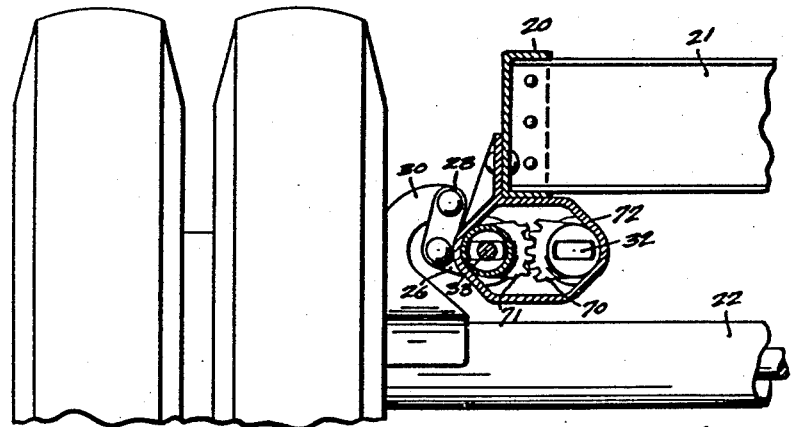

Fig. 15 is a fragmentary transverse vertical section taken to an enlarged scale on line 15—15 of Fig. 14.

Fig. 16 is a fragmentary horizontal sectional view on line 16—16 of Fig. 18 and illustrating, as a further embodiment, a single torsion rod with the reversing mechanism applied between one end thereof and the related lever, the opposite end of the rod being rotationally anchored to the other lever.

Figs. 17 and 18 are transverse vertical sections on respective lines 17—17 and 18—18 of Fig. 16.

Referring to the drawings and employing like numerals throughout all the views where an identical nature of a part permits, 20 represents one of the main-frame size girders of the chassis of a tandem rear-axle vehicle, and 21 the conventional cross-channels applied to extend transversely between said girder and a like frame girder at the opposite side of the vehicle. The tandem rear axles, indicated at 22 and 23, are each of the ordinary bodily-movable type maintaining a fixed relationship as between the revoluble axes of the two vehicle wheels supported upon opposite ends and may be either live or dead axles, and disposed to occupy positions in the approximate vertical planes of said axles are bearings 24 and 25 fixed to the frame girders. We have illustrated and reference will be had herein only to one side of the vehicle and it will be understood that each described part finds its counterpart at the opposite side of the vehicle, the operation of the structures applied to the two sides being independent other than as oscillatory movement of one end of an axle necessarily transmits a modified movement to the opposite end.

26 and 27 indicate respective levers journaled for wrist movement in the two frame bearings, and it is the characteristic of these levers that the free end of each extends in a like direction, desirably outwardly, from the journaled hub. Links 28 and 29 connect with and shackle the free ends of the levers to respective perches 30 and 31 fixedly mounted one upon the front and the other upon the rear tandem axle.

First describing the embodiment which we have illustrated in Figs. 1 through 5, inclusive, it will be seen that the two levers are given a co-axial mounting and that two torsion rods 32 and 33 are employed, the rods being applied through center-bores of the levers and approaching a meeting engagement at their inner ends, and at the outer ends extending somewhat beyond the levers proper and finding connection with the latter by the instrumentality of forming the levers with axial prolongations of the hubs, these prolongations or extensions, as 26' and 27', being provided with terminal sockets into which correspondingly shaped extremities of the torsion rods are inserted (Fig. 6). The length to which the tubular hub extensions are carried axially beyond the levers proper determines the flexibility of the spring suspension, factors such as size and the nature of the material used in the torsion rods being the same, and a proper springing of any given vehicle is thus readily attained.

Applied between and forming an interconnection from the inner end of one to the inner end of the other torsion rod is a reversing mechanism in which a lever of the first order, as 34, is given a frame journal for rocker movement about a longitudinal axis paralleling that of the torsion rods, and forming shackle connections between the two oppositely acting ends of said lever and associated levers 35 and 36, one fast to the inner end of one torsion rod and the other fast to the inner end of the other torsion rod, are links 37 and 38. The fitting of the torsion rods in the hubs of the related levers, 35 or 36 as the case may be, is or may be accomplished in the same manner as described for the outer ends of the rods.

Figure 1:
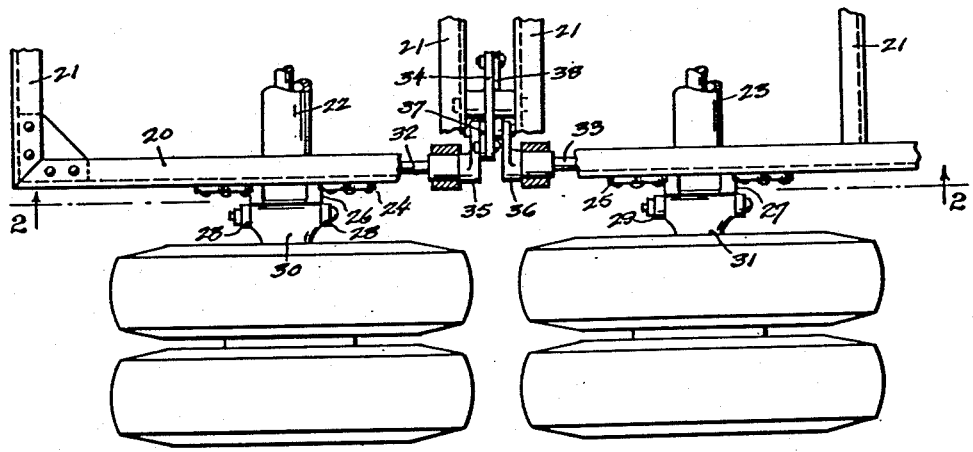
Figure 2:
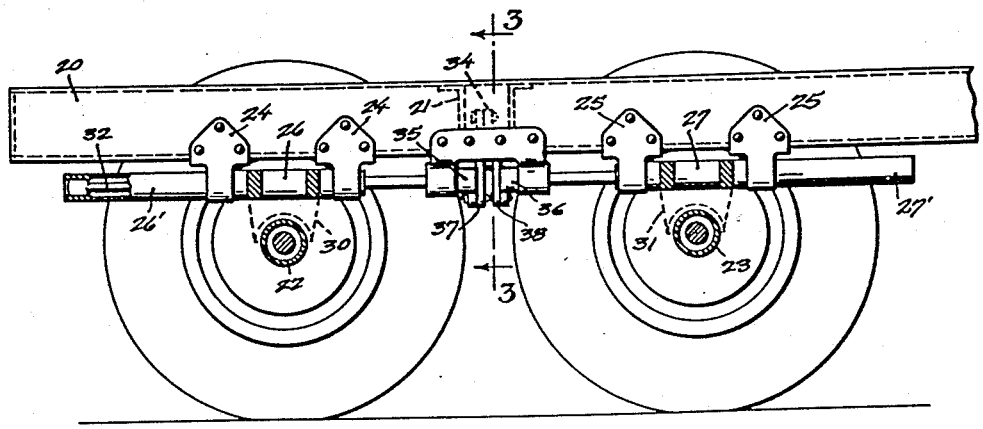
Fig. 2 is a longitudinal vertical section on line 2—2 of Fig. 1.
Figure 8:
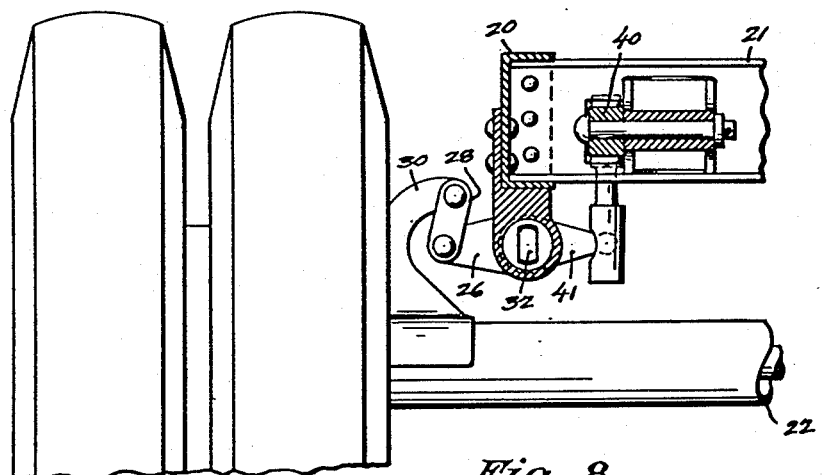
Fig. 8 is a fragmentary transverse vertical section on line 8—8 of Fig. 7.
Figure 7:
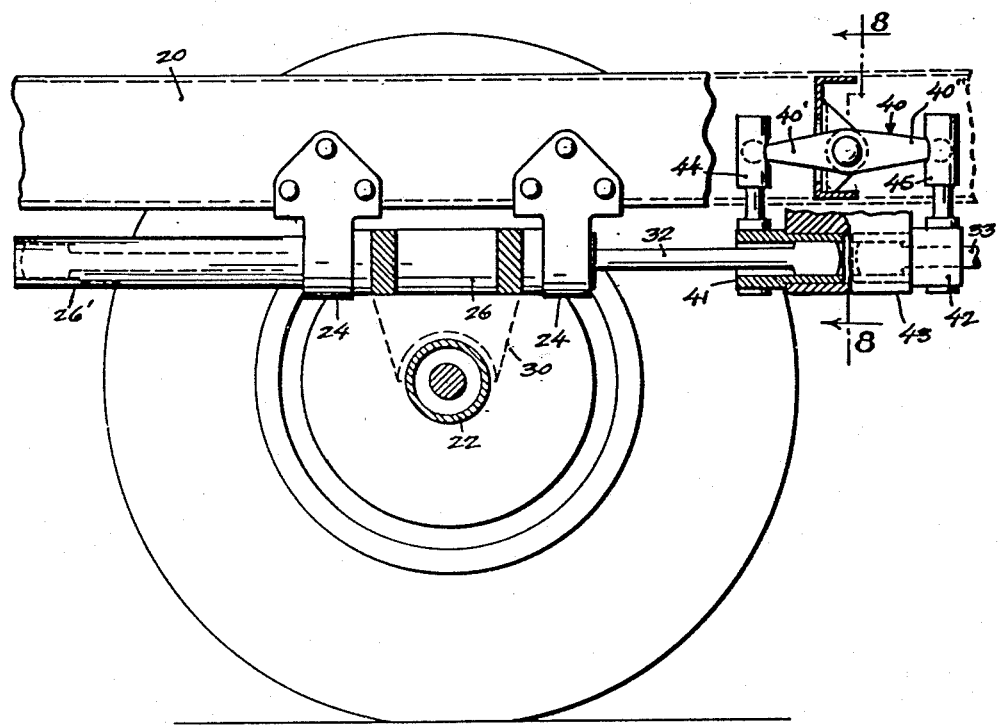
Fig. 7 is a fragmentary longitudinal vertical section illustrating a second embodiment similarly employing two interconnected torsion rods but employing a somewhat different application of a reversing lever as the connection therebetween.

In Figs. 7 and 8 we have illustrated another lever arrangement accomplishing a reversing action as between the inner ends of two complementary and co-axial torsion rods, the reversing lever in this instance being indicated by 40 and being so mounted as to work about a center axis angularly disposed with respect to the torsional axis of the rods. Levers 41 and 42 which are fixed one to one and the other to the other of the two torsion rods are journaled, as with the last-mentioned embodiment, in frame bearings 43 and have their free ends extending in like directions from the hubs into underlying relation to the extremity of a respective arm, as 40' and 40", of the lever 40, attachment therewith comprising coupling-rods 44 and 45 which are given connection by ball-and-socket joints to admit of the necessary universal action compensating the movement of the lever 40 about a fulcrum angular to that of the levers 41 and 42.

Relative to Figs. 9 and 10, the embodiment which we have illustrated therein is thought to be self-evident in its showing of levers 50 and 51 rotatively coupled to an end of a respective torsion rod opposite from the end which connects with a related axle-influenced lever 26 or 27, as the case may be, the said levers 50 and 51 being journaled in respective frame bearings 52—53 and having their free ends connecting by rods, as 54 and 55, with plungers 54'—55' received in oil cylinders 56 and 57, respectively, which are caused to be connected by a fluid-flow pipe 58.

Indicated in Figs. 11 and 12 is a reversing arrangement comprised of a set of gears which, similar to the previous embodiments, is applied to two torsion rods as an interconnection therebetween. The rods are arranged co-axially and the gears in this embodiment comprise bevel pinions 60 and 61 rotative one with one and the other with the other torsion rod or, more properly, with the inner ends thereof, and reversing interconnection is obtained through a set of four surrounding bevel pinions 62 of which each is in mesh with both primary pinions but, perforce, out of mesh with one another. Supporting the gears is a gear box 63 carried by the vehicle frame.

We have represented a modified gearing arrangement in Figs. 13 through 15 in which the two torsion rods occupy planes oblique to the longitudinal center line of the vehicle, the torsional axes being laterally spaced and the inner ends being brought into lapping relation, and reversing interconnection being obtained by the utilization of intermeshing toothed segments 70 and 71 which are given a journal in a frame-supported box 72. It is here pointed out that gear types of reversing mechanisms are perhaps less desirable than a system of levers or a hydraulic arrangement in that torsional twist is somewhat limited under ordinary operating conditions and thus the strain to which any single tooth is continually subjected causes spot wear. This objection would be most pronounced in the employment of gearing such as illustrated in Figs. 13 through 15; an arrangement such as that shown in Figs. 11 and 12 being the more desirable in that, while the former would ride on a single tooth, the latter distributes the strain over four teeth of each primary pinion. It will be readily understood that a system of levers could, if desired, be engineered into an arrangement in which two torsion rods are canted as in Fig. 13. Similarly apparent is the adaptability of this character of mounting to a hydraulic type of reversing interconnection.

As a departure from the foregoing embodiments, we illustrate in Figs. 16 through 18 a structural arrangement exemplifying one form of reversing mechanism applied to a suspension assembly in which only a single torsion rod is used while still permitting each of the two principal or axle-influenced levers 26 and 27 to extend in a like direction from the frame bearings therefor. The reversing devices which we have elected to show are functionally the counterpart of the reversing interconnection illustrated in the first of our above-described embodiments and the departure therefrom lies only in the fact that the counterpart 27" of the lever arm 35 which, in the previous embodiment, was tied to one of two torsion rods, now is fixedly attached to or produced integral with the principal lever 27. The reversing lever is comprised of oppositely acting arms 80 and 81 fast to a shaft 82 journaled for rocker movement about a frame-fixed axis paralleling that of the lever 27, and connection from one of these arms to the lever arm 27" is had by means of the link 83 while the other arm connects by a link 84 with a lever 85. The lever 85 finds a journal co-axial to the two principal levers 26 and 27 in a frame bearing 86 and is rotationally fixed to one end 87' of the single torsion rod 87 which, as in our earlier filing, is received through center-bores of both principal levers. The opposite end of the torsion rod, as 86", connects directly with the principal lever 26 or, more properly stated, with the axial prolongation 26' of its hub. It should be pointed out, in reference to the disclosure of Fig. 16, that the lever arm 27" is incorrectly shown as occupying a central position—longitudinally considered—in relation to the lever 27, a position which would cause conflict between the said arm and the axle 23. While this arm might occupy a position between the two frame bearings 25 by shifting the same longitudinally sufficient to clear the axle, the desirable construction is to produce the arm 27" as a separate part and fix the same upon an end projection of the lever 27 carried outwardly beyond the frame bearing. The object in showing the same as being mounted intermediate the two bearings 25 is to permit a clear indication, in Fig. 17, of the functionally unitary nature as between lever arm 27" and the outwardly directly oppositely moving lever arm which connects with the axle.

The invention as it pertains to a torsion-rod suspension permitting two principal axle-influenced levers to each extend in a like direction from their frame journals is thought to be clear from the foregoing disclosures of a severalty of arrangements each embodying the essential and common feature of a reversing mechanism applied, in the instance of a single torsion rod, between one end of the rod and a related principal lever and, in the instance of two or more torsion rods, as interconnections between ends thereof opposite from the ends which respond to the movements of the principal levers. Various departures beyond the showings to accomplish the objective end will be largely self-evident from the disclosures which are here made, and it is accordingly our intention that no limitations be implied.

What we claim is:

1. As a spring suspension for a tandem through-axle vehicle, wherein each of two tandem rear axles is a bodily-movable unit and is operative at all times to hold the revoluble axis of a vehicle wheel supported at one end thereof in fixed relation to the revoluble axis of a vehicle wheel supported at the other end of the axle, the combination with said tandem through-axles, and with a vehicle main frame: a pair of levers supported from the frame at each side thereof for rocker movements about axes which are generally longitudinal as respects the frame; shackle links connecting one lever of each pair to a related end of one of the axles and connecting the other lever of the pair to a related end of the other axle and operating by correspondingly directed vertical movements of the two axles to impart, to the two said levers, responsive rocker movements which are alike as to rotary direction as between the two levers; and devices including a torsion spring applied as a cushion-coupling interconnecting the two levers of each pair and arranged and adapted to subject said spring to a torsional wind-up by rocker movements of the two levers of a pair in said like directions of rotary twist.

2. Structure according to claim 1 in which said devices which interconnect the two levers of a pair are comprised of a torsion rod supported for torsional movement about an axis coinciding with the rocker axis of one of the two levers and having one of its ends connected for unitary rotary movement with the hub thereof, and connection from the other end of the rod to the other lever of the pair functioning to rotationally influence said latter end of the rod in a direction converse to the rotary twist of the last-named lever.

3. In a tandem rear-axle vehicle providing a main frame and characterized in that each of the two tandem rear axles is a bodily-movable unit operative at all times to hold the revoluble axis of a vehicle wheel suported at one end thereof in fixed relation to the revoluble axis of a vehicle wheel supported at the other end of the axle, the spring suspension applied to each side of the vehicle comprising a pair of levers supported from the frame for rocker movements about axes which are generally longitudinal as respects the frame and such as to have the arms of both levers occupy approximately horizontal planes and extend in a like direction from the rocker axes; shackle links connecting the arm of one lever to a related end of one of the axles and connecting the arm of the other lever to a related end of the other axle to have the lever arms act in like directions of movement responsive to subjection of the axles to forces causing the latter to both act in a corresponding direction of vertical movement; and a torsion-spring mechanism applied as a cushion-coupling interconnecting the two levers and arranged and adapted by the resistance thereof to torsional wind-up to yieldingly oppose movements of said lever arms in a corresponding direction, thus acting through the shackle links to yieldingly oppose like directive movements, vertically considered, of the two axles.

4. In a tandem rear-axle vehicle providing a main frame and characterized in that each of the two tandem rear axles is a bodily-movable unit operative at all times to hold the revoluble axis of a vehicle wheel supported at one end thereof in fixed relation to the revoluble axis of a vehicle wheel supported at the other end of the axle, structure applied to each side of the vehicle for springing said axles from the main frame comprising: a pair of levers supported from the frame for rocker movements about axes which are generally longitudinal as respects the frame and such as to have the arms of both levers occupy approximately horizontal planes and extend in a like direction from the rocker axes; connection from the arm of one lever to a related end of one of the axles and from the arm of the other lever to a related end of the other axle acting, by correspondingly directed vertical movements of the two axles, to cause responsive rocker movements of the two levers which are in correspondence as to rotary direction, one as respects the other said lever; a torsion rod supported for torsional movement about an axis coinciding with the rocker axis of one of the two levers and having one of its ends connected for unitary rotary movement with the hub thereof; and a reversing interconnection operatively coupling the other end of the torsion rod to the hub of the other said lever in a manner which functions to rotationally influence the last-named end of the rod in a rotary direction opposite from the rotary direction in which the last said lever is caused to rock.

5. In a tandem rear-axle vehicle providing a main frame and characterized in that each of the two tandem rear axles is a bodily-movable unit operative at all times to hold the revoluble axis of a vehicle wheel supported at one end thereof in fixed relation to the revoluble axis of a vehicle wheel supported at the other end of the axle, the combination with said tandem rear axles and the vehicle main frame: suspension mechanism for springing said axles from the main frame comprising, applied to each side of the vehicle, a pair of levers supported from the frame for rocker movements about axes which are generally longitudinal as respects the vehicle and such as to have the arms of both levers extend laterally outwardly from the respective rocker axis; connection from the arm of one lever to a related end of one of the axles for responsively rocking the lever under the influence of vertical axle movements; connection from the arm of the other lever to a related end of the other axle for responsively rocking the last-named lever under the influence of vertical movements of the last-named axle, said connections being operative to rock the two levers in like directions of rotation under the influence of axle movements which, as between the two axles, directively correspond; a torsion rod disposed co-axial to the hub of one of said levers and having one of its ends connected for unitary rotary movement with said hub; and means producing an operative interconnection from the hub of the other lever to the other end of the rod functional, by a rocker movement of the latter lever in a rotary direction corresponding to that of the first said lever, to subject the last-named end of the torsion rod to a rotary twist of opposite direction to the twist to which the first-named end of the rod is subjected.

6. In a tandem rear-axle vehicle providing a main frame and characterized in that each of the two tandem rear axles is a bodily-movable unit operative at all times to hold the revoluble axis of a vehicle wheel supported at one end thereof in fixed relation to the revoluble axis of a vehicle wheel supported at the other end of the axle, the combination with the two axles and the main frame: suspension mechanism for springing said axles from the main frame comprising, applied to each side of the vehicle, a pair of levers supported from the frame for rocker movements about axes which are generally longitudinal as respects the frame and such as to have the arms of both levers occupy approximately horizontal planes and each extend outwardly from the respective rocker axis; connection from the arm of one lever to a related end of one of the axles acting by vertical movements of the axle to responsively rock the lever; connection from the arm of the other lever to a related end of the other axle acting by vertical movements of the last-named axle to responsively rock the last-named lever, said connections being operative to rock the two levers in like directions of rotation under axle movements which, as between the two axles, directively correspond; and torsion-spring mechanism common to both levers and having interconnection therewith such as to subject the spring mechanism to a torsional wind-up under conditions causing the two levers to be rocked in a like rotary direction.

7. In a tandem rear-axle vehicle providing a main frame and characterized in that each of the two tandem rear axles is a bodily-movable unit operative at all times to hold the revoluble axis of a vehicle wheel supported at one end thereof in fixed relation to the revoluble axis of a vehicle wheel supported at the opposite end of the axle, the combination with the two axles and the main frame: suspension mechanism for springing said axles from the main frame comprising, applied to each side of the vehicle, a pair of levers supported from the frame for rocker movements about axes which are generally longitudinal as respects the vehicle and each providing a lever arm which, in the instance of one lever, extends outwardly from its rocker axis into overlying relation to a related end of one axle and, in the instance of the other lever, similarly extends outwardly from the respective rocker axis and overlies a related end of the other axle; a respective perch fixed to each said axle and carried upwardly therefrom into overhanging relation to the free end of a related lever arm; links shackling said overhanging ends of the perches to the free ends of related lever arms; and torsion-spring mechanism common to and operatively interconnected with the two levers arranged and adapted to be subjected to a torsional windup responsive to like directive movements of like ends of the two axles.

8. A spring suspension according to claim 7 in which the perch, lever, lever arm, and shackle connection for one said axle each normally occupy a position considered with respect to the related vehicle wheel substantially the same as the relationship existing between the vehicle wheel of the other axle and said latter axle's perch, lever, lever arm, and shackle connection.

9. In a tandem rear-axle vehicle providing a main frame and characterized in that each of the two tandem rear axles is a bodily-movable unit operative at all times to hold the revoluble axis of a vehicle wheel supported at one end thereof in fixed relation to the revoluble axis of a vehicle wheel supported at the other end of the axle, structure applied to each side of the vehicle for springing said axles from the main frame and comprising: a pair of levers supported from the frame for rocker movements about axes which are generally longitudinal as respects the frame; operative interconnection from the arm of one lever to a related end of one of the axles and from the arm of the other lever to a related end of the other axle acting, by correspondingly directed vertical movements of the two axles, to cause responsive rocker movements of the two levers which are in correspondence as to rotary direction, one as respects the other said lever; and devices including a torsion spring applied as a cushion-coupling interconnecting the two levers of each pair and arranged and adapted to subject said spring to a torsional wind-up by rocker movements of the two levers in said like directions of rotation.

JOHN G. HOLMSTROM.
WALLACE M. BROWN.

REFERENCES CITED

The following references are of record in the file of this patent:

UNITED STATES PATENTS

| Number | Name | Date |
|---|---|---|
| 2,333,650 | Hickman | Nov. 9, 1943 |
| 2,099,819 | Mercier | Nov. 23, 1937 |
| 2,168,630 | Schiff | Aug. 8, 1939 |
| 2,333,008 | Holmstrom et al. | Oct. 26, 1943 |
| 2,198,616 | Hickman | Apr. 30, 1940 |